United States Patent
Su et al.

(10) Patent No.: US 8,295,558 B2
(45) Date of Patent: Oct. 23, 2012

(54) IMAGE PREVIEWING SYSTEM CAPABLE OF AUTOMATICALLY MAGNIFYING FACE PORTION IN IMAGE AND MAGNIFYING METHOD THEREOF

(75) Inventors: Yu-Tsung Su, Taipei Hsien (TW); Cheng-Wei Huang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 685 days.

(21) Appl. No.: 12/535,701

(22) Filed: Aug. 5, 2009

(65) Prior Publication Data

US 2010/0272368 A1      Oct. 28, 2010

(30) Foreign Application Priority Data

Apr. 25, 2009   (CN) .......................... 2009 1 0301847

(51) Int. Cl.
*G06K 9/00* (2006.01)
(52) U.S. Cl. ........ 382/118; 382/190; 382/282; 382/298; 345/619; 345/667; 345/670; 345/671; 348/569; 348/700; 348/561; 348/581
(58) Field of Classification Search .................. 382/118, 382/190, 282, 298; 345/619, 667, 670, 671; 348/569, 700, 561, 581
See application file for complete search history.

(56) References Cited

U.S. PATENT DOCUMENTS

| 7,852,356 B2 | 12/2010 | Takikawa et al. |
| 2005/0041044 A1* | 2/2005 | Gannon ......................... 345/660 |
| 2005/0128221 A1* | 6/2005 | Aratani et al. ................ 345/619 |
| 2006/0222243 A1 | 10/2006 | Newell et al. |
| 2007/0098396 A1 | 5/2007 | Watanabe et al. |

FOREIGN PATENT DOCUMENTS

| CN | 1691740 A | 11/2005 |
| CN | 1842125 A | 10/2006 |
| CN | 1863275 A | 11/2006 |
| CN | 101300826 A | 11/2008 |

* cited by examiner

*Primary Examiner* — Mike Rahmjoo

(74) *Attorney, Agent, or Firm* — Altis Law Group, Inc.

(57) ABSTRACT

An image previewing system includes a display unit, a face portion recognition unit, a selecting unit, a comparing unit and a magnifying unit. The display unit comprises a screen configured to show an image. The face portion recognition unit is configured to recognize any human face contained in the image and determine face portions in the image if human face(s) exists in the image. The selecting unit is configured to select one of the face portions in the image. The comparing unit is configured to compare the number of image pixels of the selected face portion with the resolution of the screen of the display unit and generate a result. According to the result, the magnifying unit configured to magnify the selected face portion and display the magnified face portion on the screen.

12 Claims, 9 Drawing Sheets

IMAGE PREVIEWING SYSTEM CAPABLE OF AUTOMATICALLY MAGNIFYING FACE PORTION IN IMAGE AND MAGNIFYING METHOD THEREOF

BACKGROUND

1. Technical Field

The present disclosure relates to imaging technology and, particularly, to an image previewing system, which can automatically magnify a face portion in an image and a magnifying method for the system.

2. Description of Related Art

Image capturing devices, such as digital still cameras and camcorders, typically have a facial recognition function to facilitate capturing a portrait image. After the portrait image is captured, a user may review the portrait image via a display of the devices to determine whether face portion(s) in the captured image are clearly focused and/or the desired facial expression is captured. To provide more information for determination, the user may need to manually zoom in on a face portion in the captured image. This task is inconvenient.

Therefore, what is needed is to provide an image previewing system, which can automatically magnify face portions and a magnifying method thereof.

DETAILED DESCRIPTION

Figure 1:
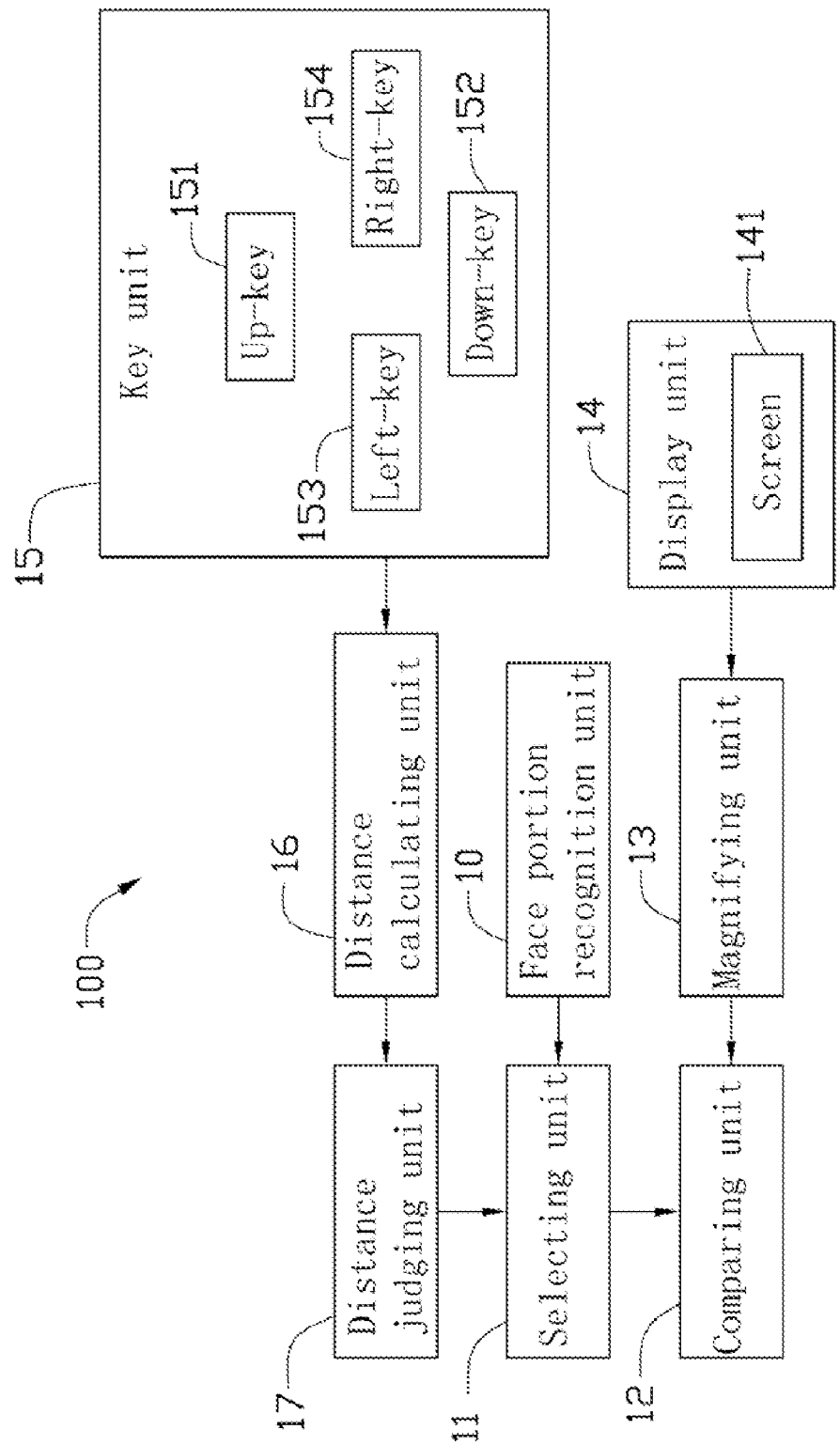
FIG. 1 is a functional block diagram of an image previewing system, according to an exemplary embodiment.
Figure 2:
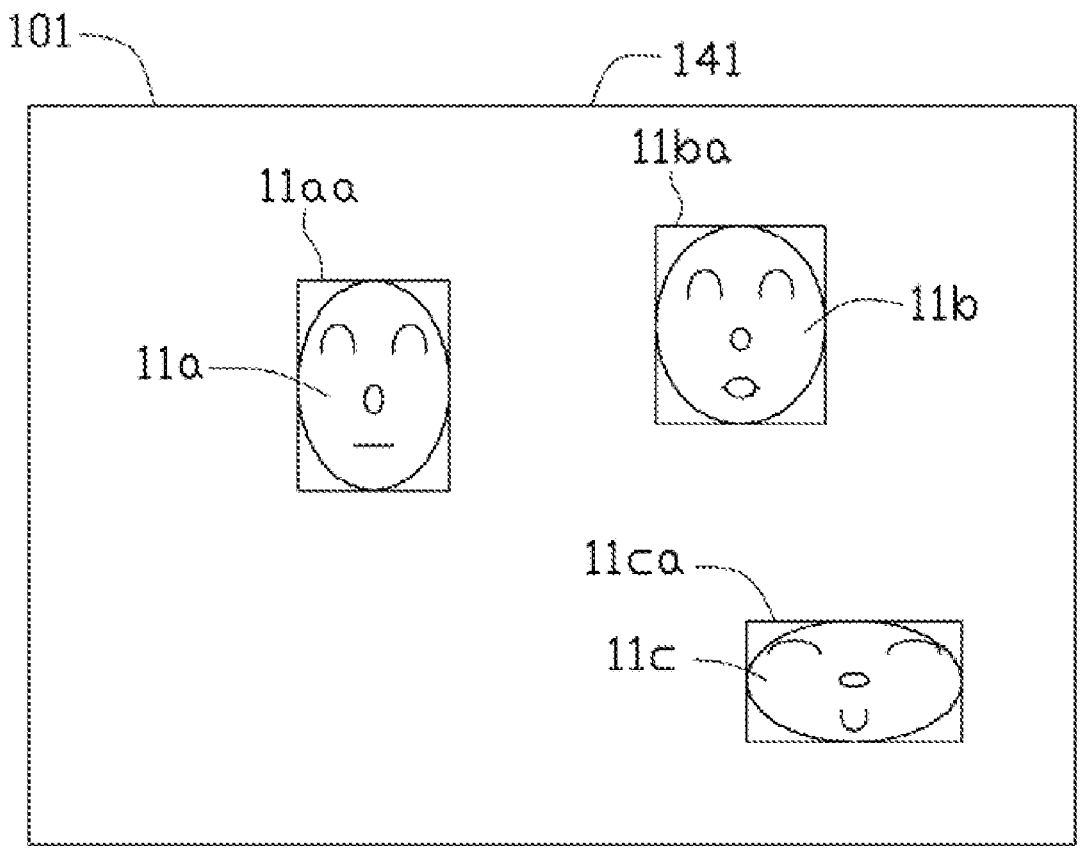
FIG. 2 is a first exemplary schematic view of a screen of the image previewing system of FIG. 1.

Referring to FIGS. 1 and 2, an image previewing system 100 is used in an image capturing device, such as a digital still camera, according to an exemplary embodiment, and includes a face portion recognition unit 10, a selecting unit 11, a comparing unit 12, a magnifying unit 13, a display unit 14, a key unit 15, a distance calculating unit 16, and a distance judging unit 17.

The face portion recognition unit 10 is configured to recognize human faces contained in an image 101 shown on a screen 141 of the display unit 14, and determining face portions in the image 101 if human faces exist in the image. The selecting unit 11 is configured to select one of the recognized face portions in the image 101. When the face portion recognition unit 10 determines only one face portion in the image 101, the selecting unit 11 directly selects the recognized face portion. The comparing unit 12 is configured to compare the number of image pixels of the selected face portion with the resolution of the screen 141 of the display unit 14 and generating a result. The magnifying unit 13 is configured to magnify the face portion (see below) according to the result, and displaying the magnified face portion on the screen 141.

The key unit 15 includes a up-key 151, a down-key 152, a left-key 153 and a right-key 154, and is configured to receive a direction instruction when a user presses one of the keys 151, 152, 153 or 154. The distance calculating unit 16 is configured to calculate a plurality of distances between the selected face portion and other face portions along a direction contained in the direction instruction in the image 101. For examples, if the user presses the down-key 152 to send the down direction instruction, face portions on the down of the selected face portion are along the down direction contained in the down direction instruction in the image 101; if the user presses the right-key 154 to send the right direction instruction, face portions on the right of the selected face portion are along the right direction contained in the right direction instruction in the image 101. The distance judging unit 17 is configured to select a minimum distance of the distances. The selecting unit 11 is also configured to select a next face portion to be magnified corresponding to the minimum distance. To be specific, when these distances are the minimum distance, the distance judging unit 17 selects one of the minimum distances randomly.

Figure 3:
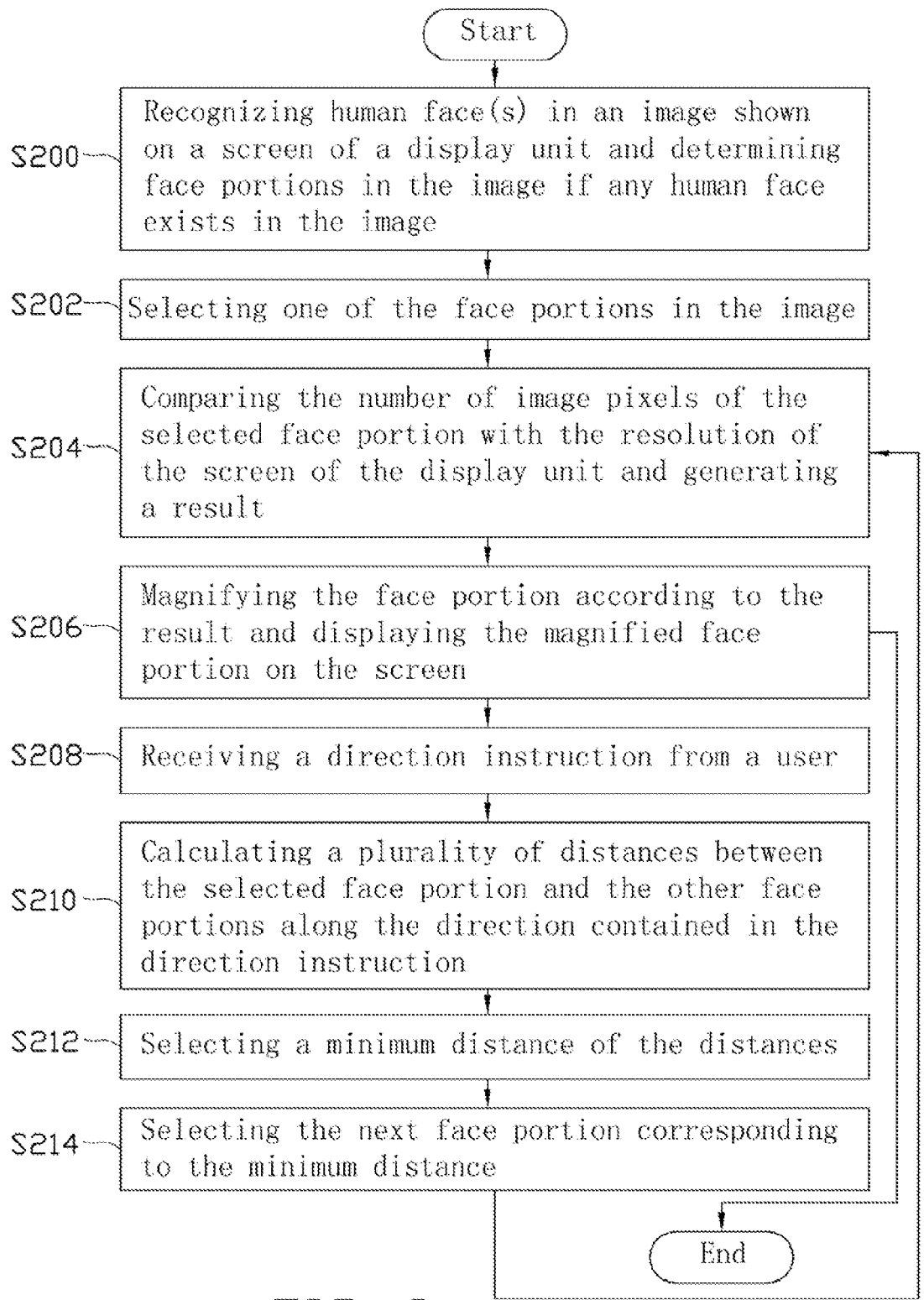
FIG. 3 is a flowchart of a magnifying method for magnifying a face portion in an image, according to an embodiment.

Further referring to FIG. 3, a magnifying method of the image previewing system 100 includes step 200 through step 214. Step 200: recognizing human face(s) in an image shown on a screen of a display unit and determining face portions in the image if any human face exists in the image. Step 202: selecting one of the face portions in the image. Step 204: comparing the number of image pixels of the selected face portion with the resolution of the screen of the display unit and generating a result. Step 206: magnifying the face portion according to the result and displaying the magnified face portion on the screen. Step 208: receiving a direction instruction from a user. Step 210: calculating a plurality of distances between the selected face portion and the other face portions along the direction contained in the direction instruction. Step 212: selecting a minimum distance of the distances. Step 214: selecting the face portion corresponding to the minimum distance. The flow goes to step 204.

In step 200, the face recognition function is performed by any available face recognition algorithm. In this embodiment, the face recognition is implemented by the face portion recognition unit 10, and the recognized face portion is rectangular. Referring to FIG. 2 again, when the face portion recognition unit 10 is activated, face portions 11a, 11b, 11c of the captured image 101 are determined, which are framed by three rectangular frames 11aa, 11ba, 11ca.

In step 202, the selecting unit 11 selects one of the face portions in the image 101. For example, the selecting unit 11 may select a most-left face portion 11a in the image 101 in default. In other embodiments, the selecting unit 11 may instead select the most-right face portion 11c for example.

In step 204, the resolution of the screen 141 is m×n pixels. In this embodiment, m=640 and n=480. The comparing unit 12 compares the number of image pixels M×N of the face portion 11a with the resolution of the screen 141 of the display unit 14 and generating a result, where m and M are number of pixels on horizontal dimensional grid, and n and N are number of pixels on vertical dimensional grid.

Figure 4:
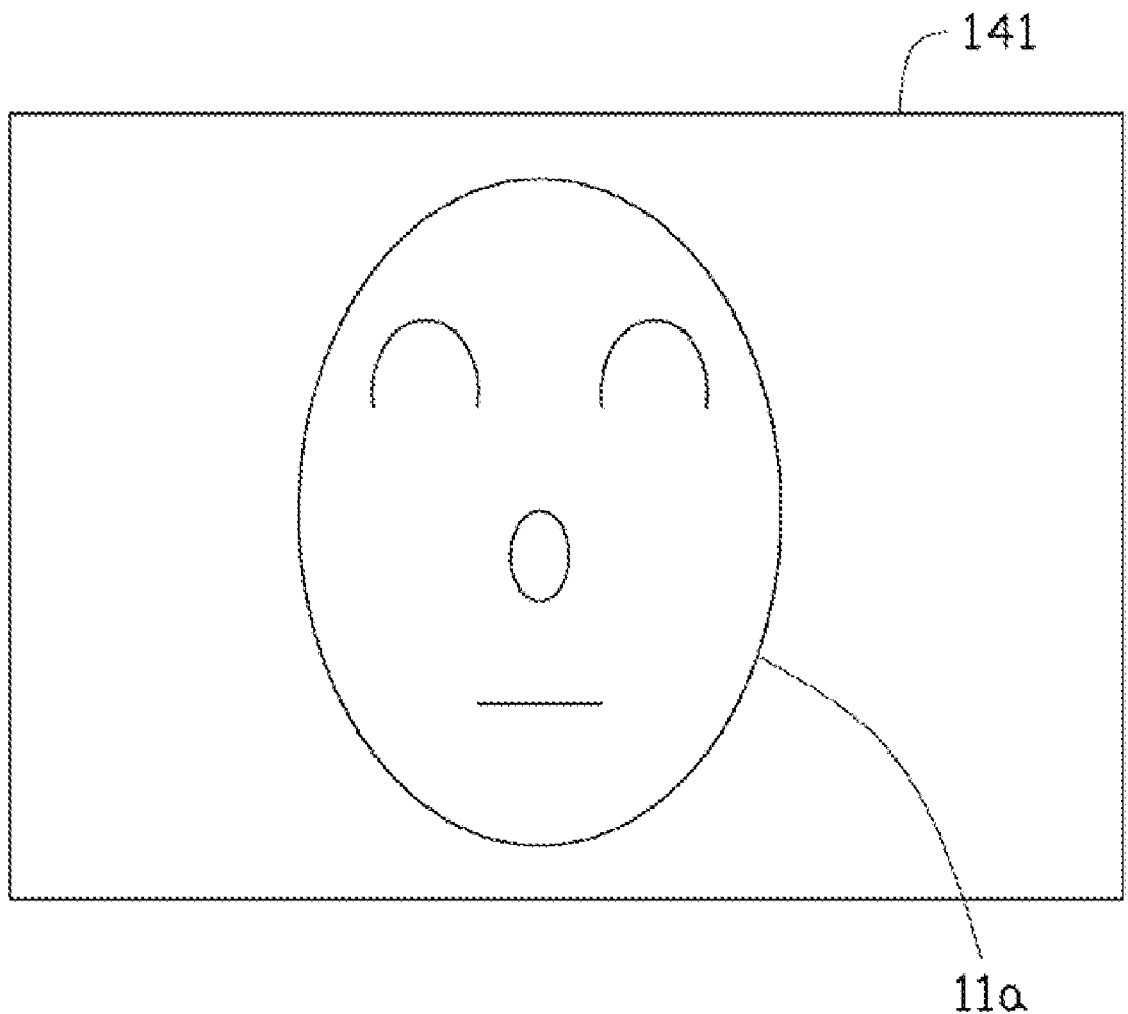
FIG. 4 is a second exemplary schematic view of the screen of the image previewing system of FIG. 1.
Figure 5:
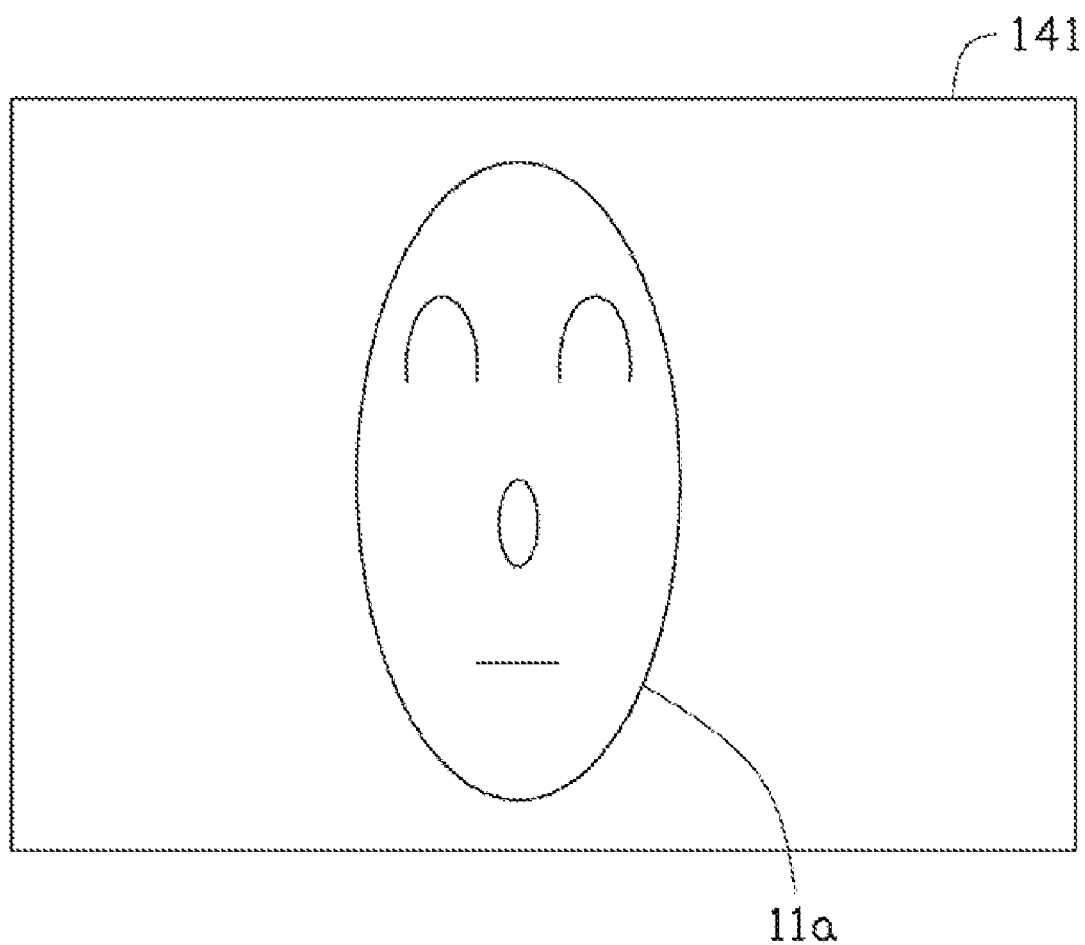
FIG. 5 is a third exemplary view of the screen of the image previewing system of FIG. 1.
Figure 6:
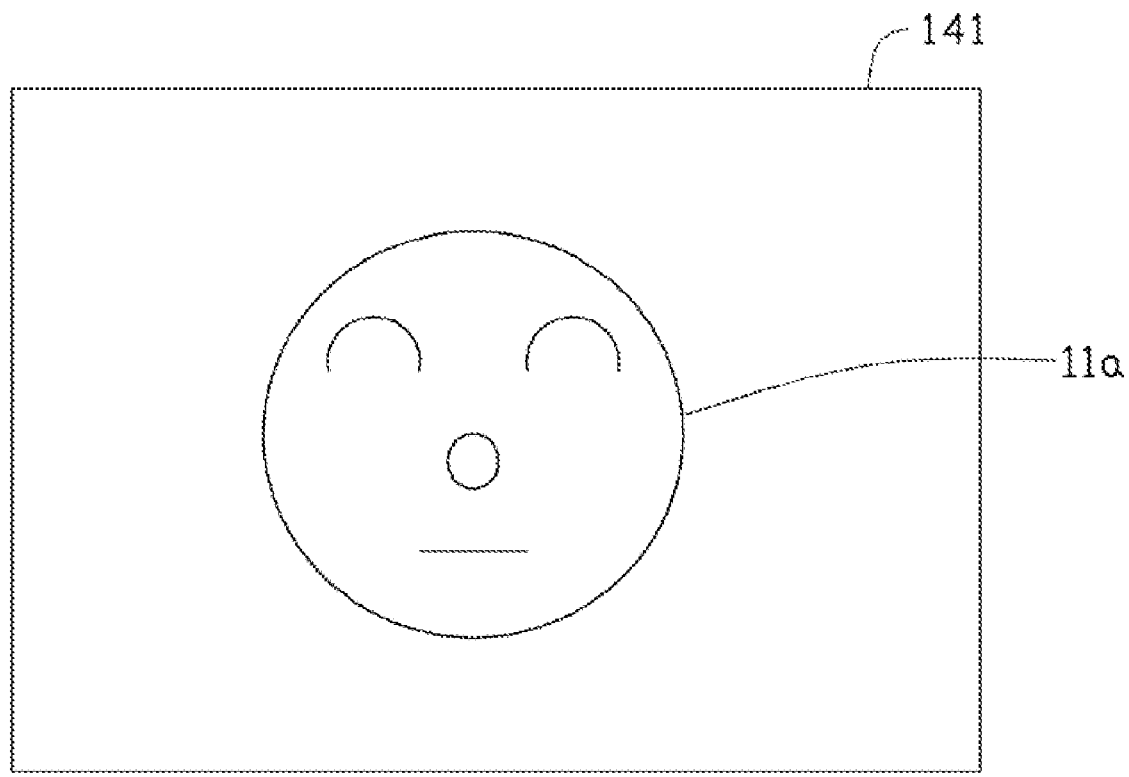
FIG. 6 is a fourth exemplary view of the screen of the image previewing system of FIG. 1.
Figure 7:
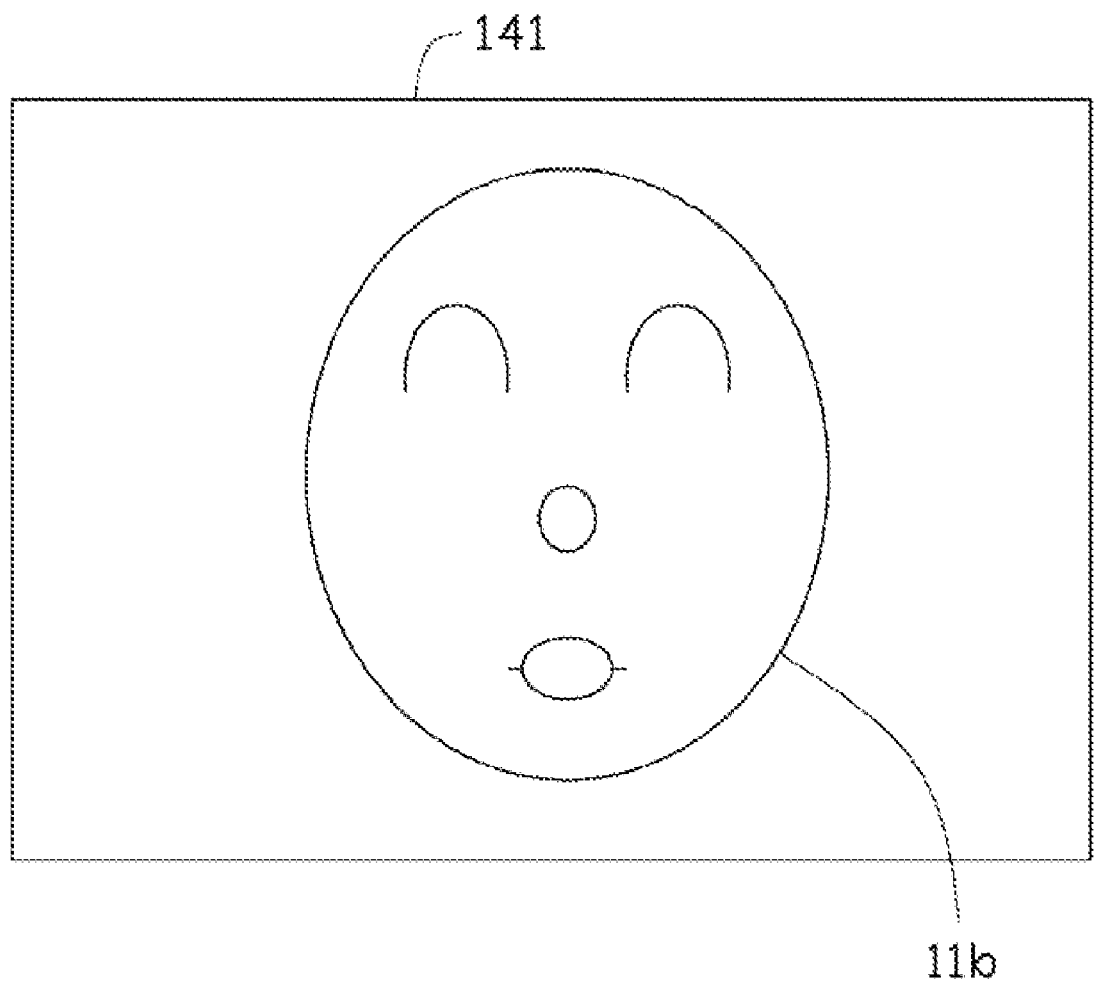
FIG. 7 is a fifth exemplary view of the screen of the image previewing system of FIG. 1.

In step 206, if N≧n and M≧m, i.e., N≧480 and M≧640, the magnifying unit 13 magnifies the face portion 11a to full-screen, as shown in FIG. 4. If N<n and M<m, i.e., N<480 and M<640, the magnifying unit 13 displays the image 101 on the screen without magnification. If N<n and M≧m, i.e., N<480 and M≧640, the magnifying unit 13 magnifies the face portion 11a horizontally to fit the width of the screen 141, as shown in FIG. 5. If N≧n and M<m, i.e., N≧480 and M<640, the magnifying unit 13 magnifies the face portion 11a vertically to fit the height of the screen 141, as shown in FIG. 6.

In step 208, a user may wish to preview other face portions 11b, 11c. In this case, the user can input a right direction instruction to the image previewing system 100 by pressing the right-key 154 of the key unit 15. The right-key 154 receives the right direction instruction of the user and sends the right direction instruction to the distance calculating unit 16.

In step 210, according to the right direction instruction from the user, the distance calculating unit 16 calculates two distances between the selected face portion 11a and the other face portions 11b, 11c. Both the face portions 11b, 11c are on the right side of the selected face portion 11a in the image 101.

In step 212, after the two distances are calculated, the distance judging unit 17 selects a minimum distance of the two distances. In step 214, the selecting unit 11 selects the face portion 11b corresponding to the minimum distance. Then, the flow goes to step 204.

After the selecting unit 11 selects a face portion in an image, shown on the screen, the face portion can be magnified to display on the screen. Therefore, it is convenient for a user to decide whether the faces in the captured image are gotten into focus or the desired face expression is captured.

Figure 8:
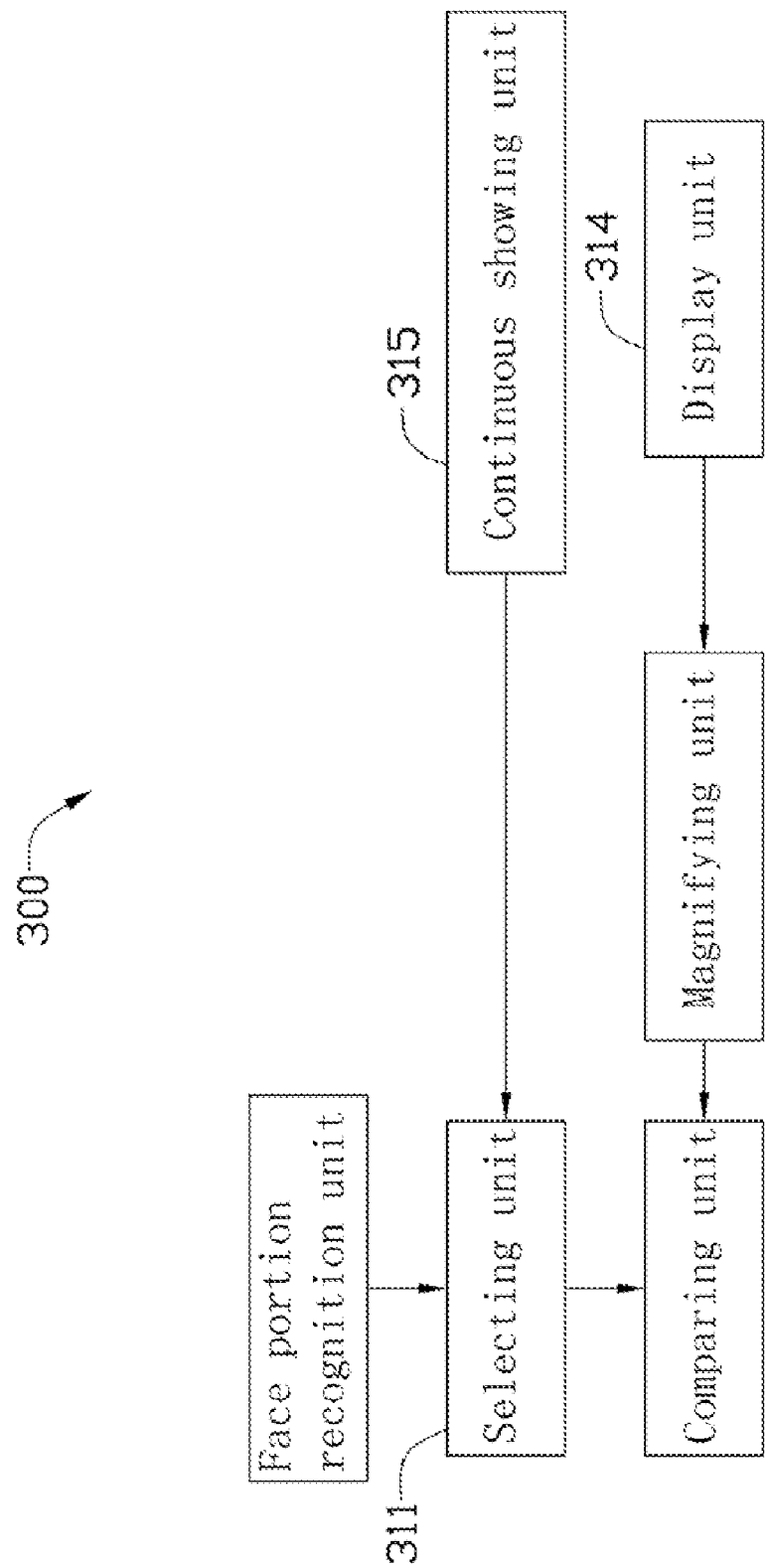
FIG. 8 is a functional block diagram of an image previewing system, according to another exemplary embodiment.

Referring to FIG. 8, an image previewing system 300 according to another exemplary embodiment is shown. The difference between the image previewing system 300 and the image previewing system 100 is that the image previewing system 300 includes a continuous showing unit 315.

The continuous showing unit 315 is configured to show a magnified face portion in an image on the screen of the display unit 314 for a predetermined time. The predetermined time can be changed during use. After the predetermined time is up, the selecting unit 311 selects one face portion that has never being selected and magnifies it instead.

Advantages of the second exemplary embodiment are similar to those of the first exemplary embodiment. Further, the second exemplary embodiment can preview face portions in the image automatically.

Figure 9:
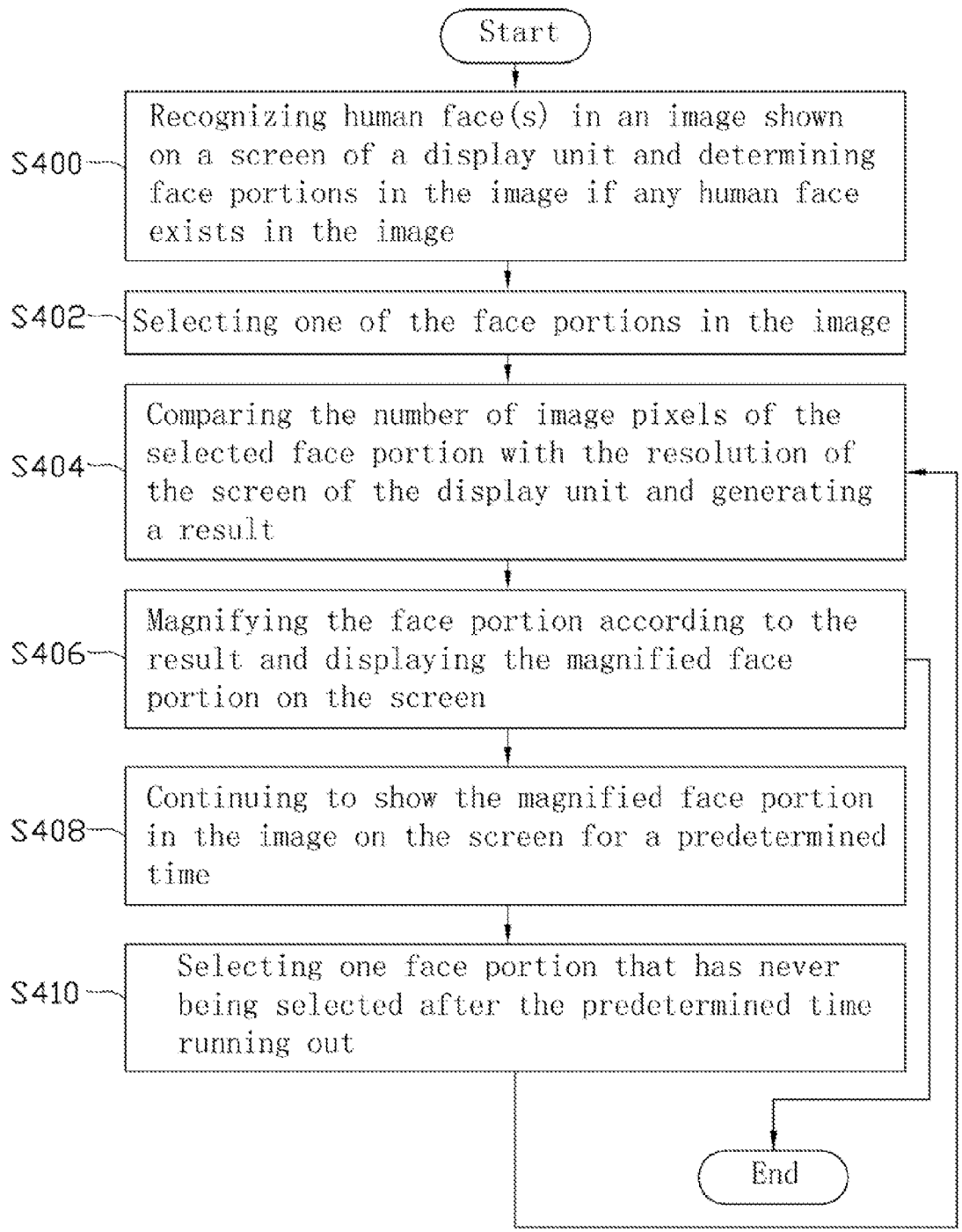
FIG. 9 is a flowchart of a magnifying method for magnifying a face portion in an image, according to yet another embodiment.

Referring to FIG. 9, a magnifying method of the image previewing system 300 includes steps 400-410. Step 400-406 is same with step 200-206 of the magnifying method of the image previewing system 100. Step 408: continuing to show the magnified face portion in the image on the screen for a predetermined time. Step 410: selecting one face portion that has never being selected after the predetermined time running out. The flow goes to step 404.

Advantages of the magnifying method of the image previewing system 300 are similar to those of the magnifying method of the image previewing system 100. Further, the magnifying method of the image previewing system 300 can preview face portions in the image automatically.

It is to be understood, however, that even though numerous has been described with reference to particular embodiments, but the present disclosure is not limited to the particular embodiments described and exemplified, and the embodiments are capable of considerable variation and modification without departure from the scope of the appended claims.

What is claimed is:

1. An image previewing system, comprising:
    a display unit comprising a screen configured to show an image;
    a face portion recognition unit configured to:
        recognize any human face contained in the image and determine face portions in the image if a human face or human faces exist in the image;
    a selecting unit configured to select one of the recognized face portions in the image;
    a comparing unit configured to compare the number of image pixels of the selected face portion with the resolution of the screen of the display unit and generate a result; and
    according to the result, a magnifying unit configured to magnify the selected face portion and display the magnified face portion on the screen; wherein the resolution of the screen is m×n pixels, and the number of image pixels of the selected face portion is M×N, where m and M are number of pixels on horizontal dimensional grid, and n and N are number of pixels on vertical dimensional grid; wherein if N≧n and M≧m, magnify the selected face portion to full-screen.

2. The image previewing system as claimed in claim 1, wherein the face portion is rectangular shaped.

3. The image previewing system as claimed in claim 1, wherein if N≧n and M<m, the magnifying unit magnifies the selected face portion vertically to fit the height of the screen.

4. The image previewing system as claimed in claim 1, wherein if N<n and M≧m, the magnifying unit magnifies the selected face portion horizontally to fit the width of the screen.

5. The image previewing system as claimed in claim 1, wherein if N<n and M<m, the magnifying unit displays the image on the screen without magnification.

6. The image previewing system as claimed in claim 1, further comprising a key unit comprising a up-key, a down-key, a left-key and a right-key and configured to receive a direction instruction from a user by pressing one or more of the keys, a distance calculating unit, configured to calculate a plurality of distances between the selected face portion and other face portions along a direction contained in the direction instruction, and a distance judging unit, configured to select a minimum distance in these distances, while the selecting unit selecting a next face portion corresponding to the minimum distance.

7. The image previewing system as claimed in claim 6, wherein these distances are the minimum distance, the distance judging unit selects one of the minimum distances randomly.

8. A magnifying method for magnifying face portions in an image to display on a screen, the method comprising:
    recognizing any human face contained in the image and determining face portions in the image if a human face or human faces exist in the image;
    selecting one of the recognized face portions in the image;
    comparing the number of image pixels of the selected face portion with the resolution of the screen of the display unit and generating a result; and
    according to the result, magnifying the selected face portion and displaying the magnified face portion on the screen; wherein the resolution of the screen is m×n pixels, and the number of image pixels of the selected face portion is M×N, where m and M are number of pixels on horizontal dimensional grid, and n and N are number of pixels on vertical dimensional grid; wherein if N≧n and M≧m, magnify the selected face portion to full-screen.

9. The method as claimed in claim 8, wherein if N≧n and M<m, magnify the selected face portion vertically to fit the height of the screen.

10. The method as claimed in claim 8, wherein if N<n and M≧m, magnify the selected face portion horizontally to fit the width of the screen.

11. The method as claimed in claim 8, wherein if N<n and M<m, display the image on the screen without magnification.

12. The method as claimed in claim 8, further comprising: receiving a direction instruction from a user; calculating a plurality of distances between the selected face portion and the other face portions along a direction contained in the direction instruction in the image; selecting a minimum distance in the distances; selecting a next face portion to be magnified corresponding to the minimum distance; and returning the comparing step.

* * * * *